(12) United States Patent
Sekine et al.

(10) Patent No.: US 11,712,858 B2
(45) Date of Patent: Aug. 1, 2023

(54) METHOD OF SHAPING PREFORM AND METHOD OF MOLDING COMPOSITE MATERIAL

(71) Applicant: SUBARU CORPORATION, Tokyo (JP)

(72) Inventors: Naoyuki Sekine, Tokyo (JP); Yuta Inoue, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 246 days.

(21) Appl. No.: 16/246,341

(22) Filed: Jan. 11, 2019

(65) Prior Publication Data

US 2019/0275749 A1   Sep. 12, 2019

(30) Foreign Application Priority Data

Mar. 6, 2018  (JP) .................................. 2018-040258

(51) Int. Cl.
*B29C 70/34* (2006.01)
*B29C 70/20* (2006.01)
(Continued)

(52) U.S. Cl.
CPC .......... *B29C 70/342* (2013.01); *B29C 70/202* (2013.01); *B29C 2791/006* (2013.01);
(Continued)

(58) Field of Classification Search
CPC .......... B32B 2255/02; B32B 2260/021; B32B 2260/023; B32B 2260/046;
(Continued)

(56) References Cited

U.S. PATENT DOCUMENTS

| 5,418,035 A * | 5/1995 | Iguchi ................. B29C 66/1122 |
| | | 428/119 |
| 2014/0349167 A1* | 11/2014 | Wakai ............... B29C 66/81429 |
| | | 429/139 |

(Continued)

FOREIGN PATENT DOCUMENTS

JP   2009-214371 A   9/2009
JP   2010-253873 A   11/2010

OTHER PUBLICATIONS

Bhatt, Sanjiv, "Influence of molecular weight on the properties of poly(ether ether ketone)", 2010, Society of Plastics Engineers (Year: 2010).*

*Primary Examiner* — Michael M. Robinson
*Assistant Examiner* — Victoria Bartlett
(74) *Attorney, Agent, or Firm* — Troutman Pepper Hamilton Sanders LLP

(57) ABSTRACT

A method of shaping a preform includes: laminating plural dry tape members each including a binder and fiber while partly heat-sealing the dry tape members with the binder to provisionally fasten each dry tape member to an adjacent dry tape member; bending the dry tape members having been provisionally fastened, along a bending line; and heat-sealing the dry tape members having been bent with the binder to manufacture a shaped dry preform. At the laminating, at least one of the followings is satisfied: (i) an amount of heat-sealing with the binder is changed in an area along the bending line, (ii) an amount of heat-sealing with the binder is different between portions adjacent to and on opposite sides of the area along the bending line, or (iii) an amount of heat-sealing with the binder is different between portions adjacent to each other at the bending line as a border.

9 Claims, 8 Drawing Sheets

(51) Int. Cl.
*B32B 27/12* (2006.01)
*B32B 37/00* (2006.01)
*B32B 37/10* (2006.01)
*B32B 37/06* (2006.01)
*B32B 38/08* (2006.01)

(52) U.S. Cl.
CPC ........... *B32B 27/12* (2013.01); *B32B 37/0084* (2013.01); *B32B 37/06* (2013.01); *B32B 37/1018* (2013.01); *B32B 38/08* (2013.01); *B32B 2255/02* (2013.01); *B32B 2260/023* (2013.01); *B32B 2260/046* (2013.01); *B32B 2309/68* (2013.01)

(58) Field of Classification Search
CPC . B32B 2309/68; B32B 27/12; B32B 37/0084; B32B 37/06; B32B 37/1018; B32B 37/1207; B32B 38/08; B32B 38/1866; B29C 2791/006; B29C 70/00; B29C 70/202; B29C 70/342
See application file for complete search history.

(56) References Cited

U.S. PATENT DOCUMENTS

| | | | |
|---|---|---|---|
| 2018/0229452 A1* | 8/2018 | Ogale | B29C 65/522 |
| 2019/0084214 A1* | 3/2019 | Drexler | B29C 51/30 |

* cited by examiner

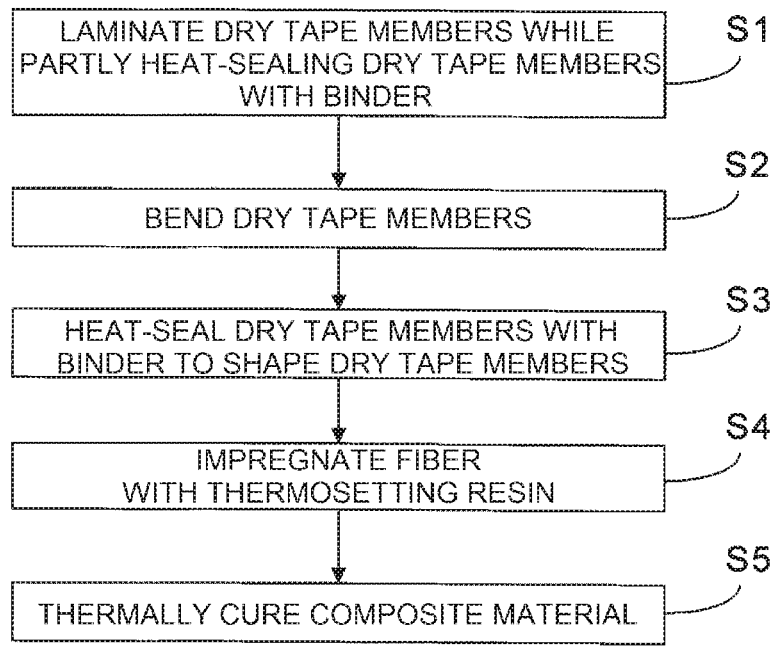
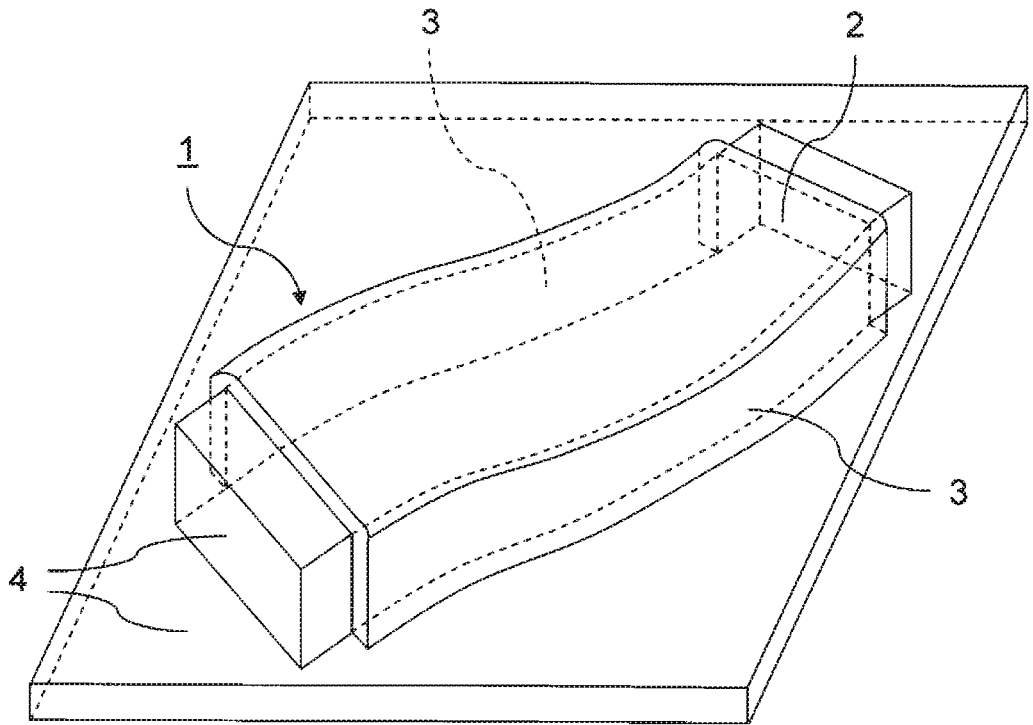

HEAT-SEALING POINT

HEAT-SEALING POINT

A-A

HEAT-SEALING POINT

HEAT-SEALING POINT

HEAT-SEALING POINT

HEAT-SEALING POINT

METHOD OF SHAPING PREFORM AND METHOD OF MOLDING COMPOSITE MATERIAL

CROSS-REFERENCE TO RELATED APPLICATIONS

The present application claims priority from Japanese Patent Application No. 2018-040258 filed on Mar. 6, 2018, the entire contents of which are hereby incorporated by reference.

BACKGROUND

1. Technical Field

Examples of the present invention relate to a method of shaping a preform and a method of molding a composite material.

2. Related Art

Resin transfer molding (RTM) methods have been known as a method of molding a composite material of resin reinforced with fiber, such as glass fiber reinforced plastics (GFRP) and carbon fiber reinforced plastics (CFRP).

The RTM methods are methods of molding a composite material that include laminating fiber sheets, impregnating the fiber sheets with a thermosetting resin, and thermally curing the fiber sheets. Among the RTM methods, a method including evacuation to impregnate fiber with a resin is called vacuum assisted resin transfer molding (VaRTM), and a method including resin impregnation using dies is called matched-die RTM.

In the case of molding a composite material by an RTM method, a dry preform is manufactured prior to resin impregnation. The dry preform is a laminate of fiber sheets that is shaped in accordance with a shape of the composite material after molding. The dry preform is manufactured by laminating fiber sheets. However, in many cases, a thermoplastic binder is interposed between the fiber sheets so that the fiber sheets are provisionally fastened not to slide from one another (see, for instance, Japanese Unexamined Patent Application Publication (JP-A) No. 2010-253873 and JP-A No. 2009-214371).

A tape-shaped fibrous base material is called a dry tape member. A dry tape member on which a thermoplastic nonwoven cloth is superposed and a dry tape member to which thermoplastic fine particles are adhered are available on the market. In laminating dry tape members including a thermoplastic binder, the dry tape members are heat-sealed with the binder in a spotted manner at regular intervals using an exclusive-use heater so as to provisionally fasten each of the dry tape members to an adjacent dry tape member. This makes it possible to prevent the laminated dry tape members from being displaced from one another or coming off.

SUMMARY OF THE INVENTION

An aspect of the present invention provides a method of shaping a preform including: laminating a plurality of dry tape members each including a binder and fiber while partly heat-sealing the plurality of dry tape members with the binder to provisionally fasten each of the plurality of dry tape members to an adjacent dry tape member; bending the plurality of dry tape members, which have been provisionally fastened, along a bending line; and heat-sealing the plurality of dry tape members, which have been bent, with the binder to manufacture a shaped dry preform, in which at the laminating, at least one of the followings is satisfied:

(i) an amount of heat-sealing with the binder is changed in an area along the bending line, (ii) an amount of heat-sealing with the binder is different between portions adjacent to and on opposite sides of the area along the bending line, or (iii) an amount of heat-sealing with the binder is different between portions adjacent to each other at the bending line as a border.

An aspect of the present invention provides a method of molding a composite material including impregnating the dry preform, which has been manufactured by the above-described method of shaping the preform, with a thermosetting resin, and thermally curing the preform to manufacture the composite material.

BRIEF DESCRIPTION OF THE DRAWINGS

FIG. 1 is a flowchart of a procedure of a method of molding a composite material including a method of shaping a preform according to a first example of the present invention.

FIG. 2 is a perspective view of a preform and a composite material to be manufactured by the method of shaping the preform and the method of molding the composite material illustrated in FIG. 1, illustrating an exemplary shape of the preform and the composite material.

DETAILED DESCRIPTION

Figure 3:
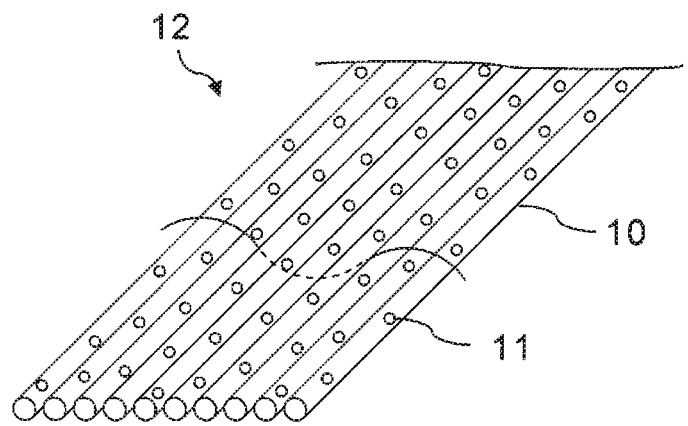
FIG. 3 is a perspective view of a dry tape member of fiber to which fine particles of a thermoplastic resin as a thermoplastic binder are adhered, illustrating a configuration of the dry tape member.

In the following, some preferred examples of the present invention are described in detail with reference to the accompanying drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the present invention is omitted.

In the case of manufacturing a dry preform of a complicated shape by drape forming in which a laminate of dry tape members is pressed on a male die, it is necessary to make the dry tape members slide from one another and be deformed after laminating the dry tape members. Consequently, in the case of provisionally fastening the dry tape members by heat-sealing with a thermoplastic binder, the dry tape members may wrinkle or be ripped, thus degrading a shaping quality of the dry preform.

It is therefore desirable to ensure shaping a dry preform of an improved quality even if the dry preform has a complicated shape.

First Example

FIG. 1 is a flowchart of a procedure of a method of molding a composite material including a method of shaping a preform according to a first example of the present invention. FIG. 2 is a perspective view of a preform and a composite material to be manufactured by the method of shaping the preform and the method of molding the composite material illustrated in FIG. 1, illustrating an exemplary shape of the preform and the composite material.

Steps of an RTM method illustrated in FIG. 1 may be taken to manufacture a composite material 1 having the exemplary shape illustrated in FIG. 2. In an instance illustrated in FIG. 2, the shape of the composite material 1 to be manufactured includes a web 2 and two flanges 3 disposed on one surface of the web 2. Consequently, a die 4 of a flat plate including a protrusion thereon may be used to mold the composite material 1.

In the case of molding a composite material by the RTM method that includes laminating fiber sheets, impregnating the fiber sheets with a thermosetting resin, and thermally curing the fiber sheets, it is necessary to shape a dry preform having a shape in accordance with a shape of the composite material. Because the dry preform has substantially the same shape as the composite material 1, the common die 4 may be used to shape the dry preform. However, other than the die 4 to thermally cure the composite material 1, a die to shape the dry preform may be used.

The dry preform may be manufactured as a laminate of a plurality of fiber sheets. However, mere lamination of fiber sheets may unfortunately cause displacement of the fiber sheets from one another. In view of this, dry tape members including a thermoplastic binder and fiber in the form of tapes have been developed into products. Use of dry tape members as a material of the dry preform makes it possible to laminate the dry tape members while partly heat-sealing the dry tape members with the binder to provisionally fasten the dry tape members not to slide.

FIG. 3 is a perspective view of a dry tape member of fiber to which fine particles of a thermoplastic resin as a thermoplastic binder are adhered, illustrating a configuration of the dry tape member.

As illustrated in FIG. 3, a dry tape member 12 including a bundled fiber sheet 10 to which fine particles 11 of the thermoplastic resin as the thermoplastic binder are adhered is available on the market.

Figure 4:
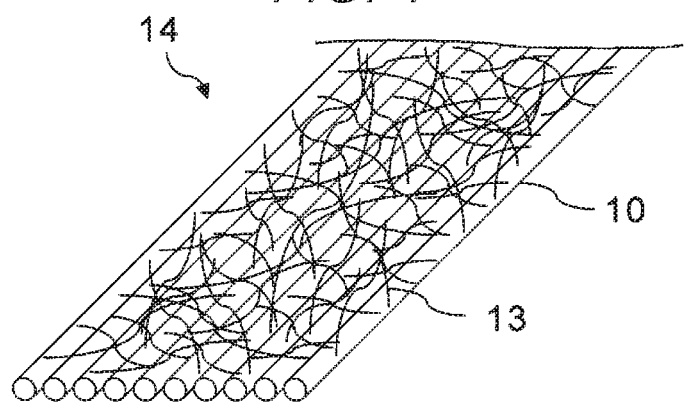
FIG. 4 is a perspective view of a dry tape member of fiber to which a thermoplastic nonwoven cloth as the thermoplastic binder is adhered, illustrating a configuration of the dry tape member.

FIG. 4 is a perspective view of a dry tape member of fiber to which a thermoplastic nonwoven cloth as the thermoplastic binder is adhered, illustrating a configuration of the dry tape member.

As illustrated in FIG. 4, a dry tape member 14 including the bundled fiber sheet 10 on which a thermoplastic nonwoven cloth 13 as the thermoplastic binder is superposed is also on the market.

As illustrated in FIGS. 3 and 4, the dry tape members including the fiber to which the thermoplastic binder is adhered are available on the market and therefore easily obtained. In view of this, the following description will refer to an instance of using the thermoplastic binder as the binder. However, insofar as heat-sealing is possible, not only the thermoplastic resin but also thermosetting resins and other resins such as an elastomer may be used as the binder.

The dry preform is manufactured as a laminate of a plurality of dry tape members. Consequently, a dry tape member is cut into a shape of each fiber layer of the dry preform in a developed state.

Figure 5:
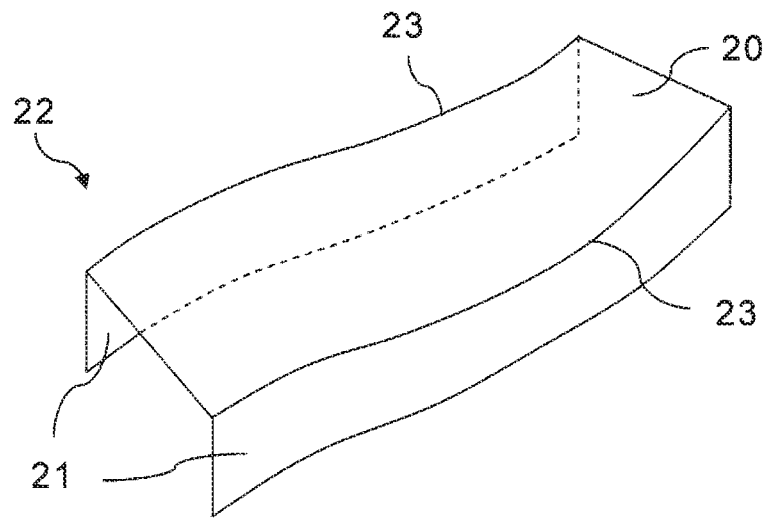
FIG. 5 is a perspective view of a shaped dry tape member that constitutes each layer of a dry preform manufactured for the composite material illustrated in FIG. 2, illustrating a shape of the dry tape member.

FIG. 5 is a perspective view of a shaped dry tape member that constitutes each layer of the dry preform manufactured for the composite material 1 illustrated in FIG. 2, illustrating a shape of the dry tape member.

The dry preform may be manufactured as a bent laminate of dry tape members 22 each having a web surface 20 to form the web 2 of the composite material 1 and flange surfaces 21 to respectively form the two flanges 3, as illustrated in FIG. 5. Because the web 2 of the composite material 1 illustrated in FIG. 5 is a flat surface, the web surface 20 of the dry tape member 22 is also a flat surface. Meanwhile, because each of the flanges 3 of the composite material 1 illustrated in FIG. 5 is curved to have a curved surface, each of the flange surfaces 21 of the dry tape member 22 also has a curved surface.

As a matter of course, in the case of molding a composite material having a curved web and a composite material having flat flanges, a dry preform may be manufactured as a laminate of the dry tape members 22 having curved web surfaces and as a laminate of the dry tape members 22 having flat flange surfaces. That is, a dry preform may be manufactured as a laminate of the dry tape members 22 having a shape in which a curved surface and a flat surface are coupled or a curved surface and a curved surface are coupled at a bending line 23.

Figure 6:
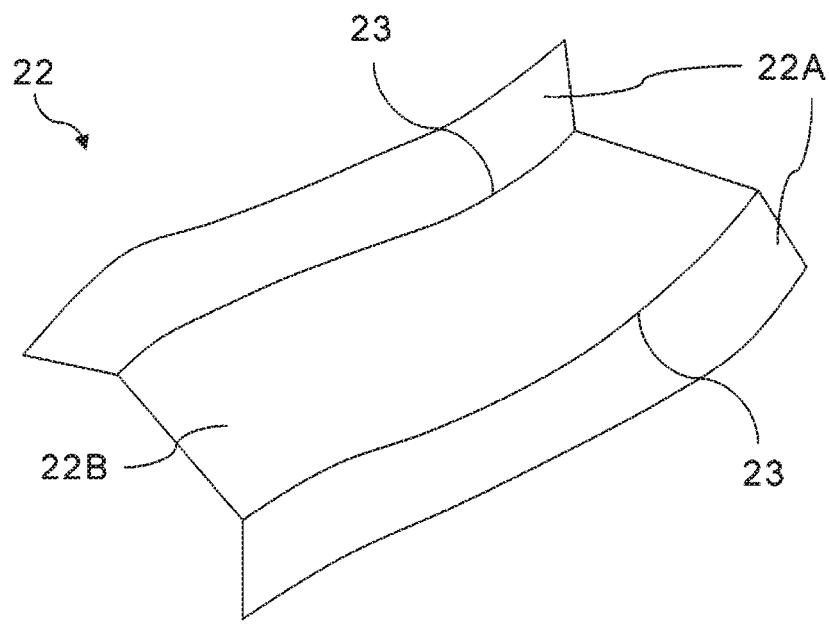
FIG. 6 is a perspective view of the dry tape member illustrated in FIG. 5 in a developed state.

FIG. 6 is a perspective view of the dry tape member 22 illustrated in FIG. 5 in a developed state.

In order to manufacture the laminate of the dry tape members 22 having the shape illustrated in FIG. 5, it is necessary to prepare, as a material, the dry tape members 22 having a shape developed into a plane, as illustrated in FIG. 6. For this purpose, the dry tape member 22 is cut into the shape developed into a plane, as illustrated in FIG. 6. In the case of manufacturing a laminate of dry tape members 22 having a different shape, similarly, the dry tape members 22 having a shape developed into a plane are prepared as a material.

Then, the flat dry tape members 22 are laminated on a desired die. Although the flat dry tape members 22 may be laminated on the die 4 illustrated in FIG. 2, lamination on a die on a flat plate facilitates lamination work. Lamination of the dry tape members 22 may be automatically performed by an automatic laminator or may be manually performed by an operator. In the case of automatically laminating the dry tape members 22 by the automatic laminator, it is practical to laminate the dry tape members 22 on a die on a flat plate in view of using a general-purpose automatic laminator.

In laminating the dry tape members 22, the dry tape members 22 are partly heat-sealed with the thermoplastic binder by a heater to prevent the laminated dry tape members 22 from sliding and being displaced from one another. That is, adjacent dry tape members 22 in a thickness direction and a lamination direction are partly adhered to one another by heat-sealing with the thermoplastic binder. This prevents the laminated dry tape members 22 from being displaced from one another.

The binder may be heated by an automatic heater or manually heated by an operator using a portable heater. As a heater to weld the binder on the fiber, an ultrasonic welder and a laser welder have been known. Alternatively, an automatic laminator to laminate the dry tape members 22 and weld the binder automatically has been developed into a product.

Use of a heater makes it possible to perform spot welding of the binder. Consequently, adjacent dry tape members 22 may be adhered to one another at a large number of points to provisionally fasten the dry tape members 22 while laminating the dry tape members 22.

As described above, at step S1, which is a step of laminating the fiber sheets in the flowchart of FIG. 1, a plurality of dry tape members made of the thermoplastic binder and the fiber are laminated on the die for lamination of the dry tape members while the dry tape members are partly heat-sealed with the thermoplastic binder to provisionally fasten each of the dry tape members to an adjacent dry tape member.

It should be noted that the laminated flat dry tape members 22 are each to be bent into the shape having the web surface 20 and the flange surfaces 21, as illustrated in FIG. 5. Consequently, to bend each of the dry tape members 22, it is necessary to partly slide each of the dry tape members 22. Conversely, in bending each of the dry tape members 22, when part of each of the dry tape members 22 that requires sliding does not slide, the dry tape members 22 may wrinkle or be ripped, thereby degrading the quality of the dry preform.

In view of this, an amount of heat-sealing with the thermoplastic binder is changeable in accordance with a shape of the dry preform and each of the dry tape members 22 after shaping. As illustrated in FIG. 5, each of the dry tape members 22 is bent along the bending lines 23 into the shape having the web surface 20 and the flange surfaces 21. As in this case, when each of the dry tape members 22 is bent along the bending lines 23, portions 22A that are bent along the bending lines 23 are made to slide to some extent to prevent the dry tape member 22 from wrinkling and being ripped.

In view of this, it is appropriate to determine the amount of heat-sealing at such a value that the portions 22A to be bent along the bending lines 23 are made to slide to some extent. For this purpose, the amount of heat-sealing with the thermoplastic binder may be different between the portions 22A and a portion 22B of the dry tape member 22 that are adjacent to each other at the bending line 23 as a border. Specifically, an amount of heat-sealing with the thermoplastic binder in the portions 22A to be bent along the bending lines 23 in a plurality of dry tape members 22 may be made less than an amount of heat-sealing with the thermoplastic binder in the portions 22B adjacent to the portions 22A to be bent.

This makes it possible to limit a range where the portions 22A to be bent along the bending lines 23 are slidable. That is, the portions 22A to be bent along the bending lines 23 may be made to slide in a range required for bending while provisionally fastening the portions 22A to adjacent dry tape members 22.

Figure 7:
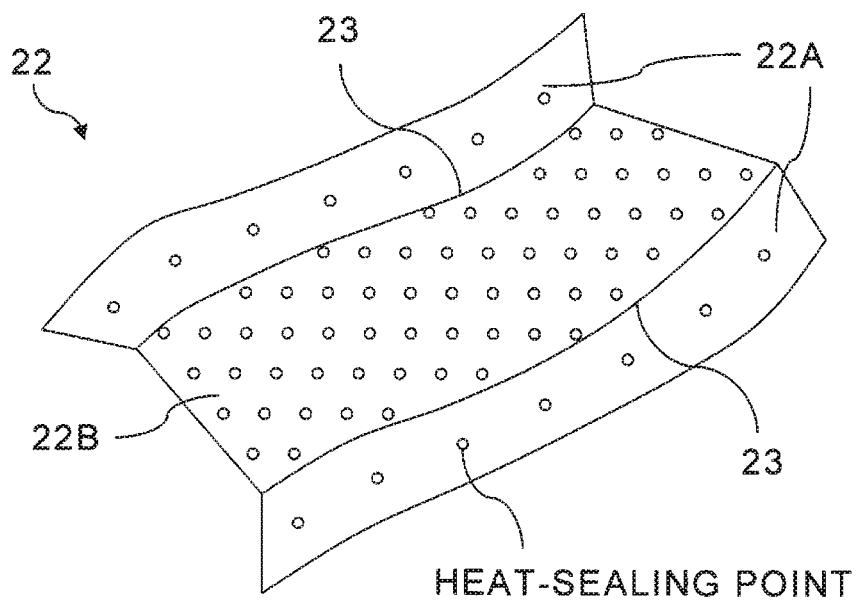
FIG. 7 is a diagram illustrating an instance in which intervals between heat-sealing points with the binder are changed at bending lines as borders of the dry tape member illustrated in FIG. 6.

FIG. 7 is a diagram illustrating an instance in which intervals between heat-sealing points with the binder are changed at the bending lines 23, as borders, of the dry tape member 22 illustrated in FIG. 6.

As illustrated in FIG. 7, intervals between heat-sealing points with the thermoplastic binder in the portions 22A to be bent along the bending lines 23 in the plurality of dry tape members 22 may be larger than intervals between heat-sealing points with the thermoplastic binder in the portions 22B adjacent to the portions 22A to be bent.

In a more specific instance, while the intervals between heat-sealing points to be locally heated may be made as narrow as approximately 3 inches in the portions 22B to be the web 2 shaped as a flat surface, the intervals between heat-sealing points to be locally heated may be made as wide as approximately 5 inches to 10 inches in the portions 22A to be the flanges 3 shaped as curved surfaces of a large curvature.

This makes it possible to make the amount of heat-sealing with the thermoplastic binder in the portions 22A to be each of the flanges 3 less than the amount of heat-sealing with the thermoplastic binder in the portions 22B to be the web 2. It becomes also possible to provisionally fasten the portions 22B to be the web 2 to sufficiently decrease a sliding amount. Meanwhile, it becomes possible to provisionally fasten the portions 22A to be the flanges 3 to prevent the portions 22A from being largely detached while making the portions 22A slide to some extent to avoid wrinkling and being ripped when bent. As a matter of course, the same applies to the portions 22B to be the web 2 that are not flat surfaces but curved surfaces of a small curvature.

Local heating at irregular intervals between heat-sealing points may be manually performed by an operator using a portable heater. Alternatively, local heating may be automatically performed using an automatic heater with a three-axis movement mechanism and a robot arm. In the case of automatically performing local heating at irregular intervals between heat-sealing points using an automatic heater, positioning of the heat-sealing points may be determined by numerical control (NC) using NC programs.

Figure 8:
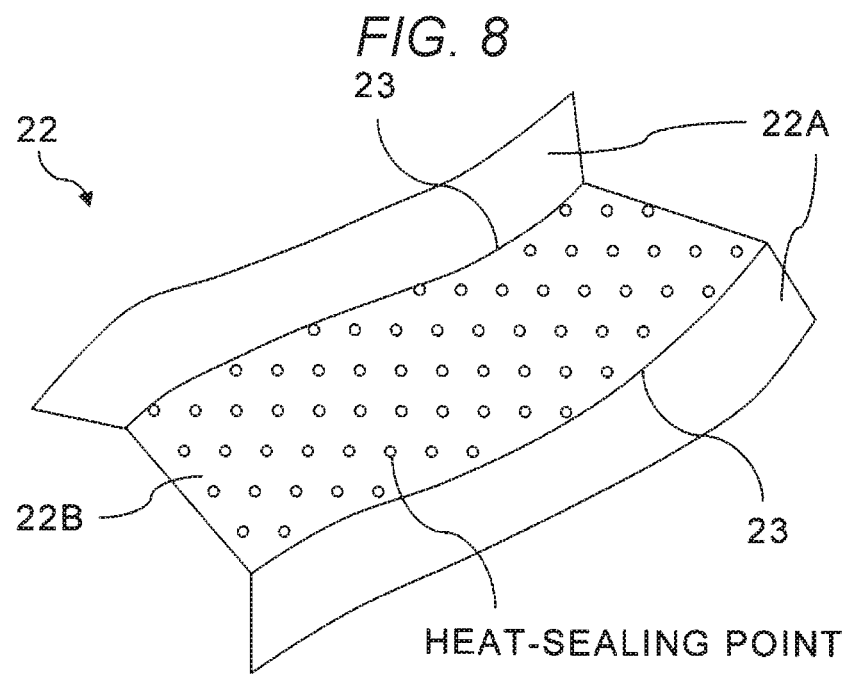
FIG. 8 is a diagram illustrating an instance in which portions of the dry tape member illustrated in FIG. 6 that are to be bent along the bending lines are not heat-sealed.

FIG. 8 is a diagram illustrating an instance in which the portions 22A of the dry tape member 22 illustrated in FIG. 6 that are to be bent along the bending lines 23 are not heat-sealed.

As illustrated in FIG. 8, the portions 22A to be bent along the bending lines 23 in the plurality of dry tape members 22 may not be heat-sealed with the thermoplastic binder, and the portions 22B adjacent to the portions 22A to be bent may be heat-sealed with the thermoplastic binder. In other words, as a method of making an amount of heat-sealing with the thermoplastic binder in the portions 22A to be bent along each of the bending lines 23 in the plurality of dry tape members 22, such as the portions 22A to be each of the flanges 3, smaller than an amount of heat-sealing with the thermoplastic binder in the portions 22B adjacent to the portions 22A to be bent, such as the portions 22B to be the web 2, the amount of heat-sealing with the thermoplastic binder in the portions 22A to be bent along the bending lines 23 in the dry tape members 22 may be made zero. In this case, it is possible to make the intervals of heat-sealing points constant to facilitate heating work.

When lamination including provisional fastening of the developed dry tape members 22 is completed, the plurality of dry tape members 22 provisionally fastened to each other are bent along the bending lines 23 at step S2. For this purpose, in the case where the plurality of dry tape members 22 provisionally fastened are laminated on a lamination die of a flat plate shape, the laminate of the dry tape members 22 provisionally fastened is placed on the die 4 for molding the composite material 1 as illustrated in FIG. 2 or a die for shaping the dry preform that has substantially the same shape as the die 4 for molding the composite material 1. Then, the plurality of dry tape members 22 provisionally fastened are bent along the die 4 for molding the composite material 1 or the die for shaping the dry preform.

This makes it possible to form a laminate of the dry tape members 22 that has a shape having (i) a curved surface and a flat surface that are coupled at each of the bending lines 23 or (ii) a curved surface and a curved surface that are coupled at each of the bending lines 23, which shape is similar to the shape of the laminate of the dry tape members 22 including the web surface 20 and the flange surfaces 21 as illustrated in FIG. 5. In particular, the amount of heat-sealing with the binder in the portions 22A to be bent along the bending lines 23 of the dry tape members 22 is adjusted to make the portions 22A to be bent only slide to a degree required for bending. This makes it possible to form the laminate of the dry tape members 22 without wrinkles and being ripped.

Next, at step S3, the bent laminate of the dry tape members 22 is wholly heated by a heater. Practically, as described later, the die 4 for molding the composite material 1 or the die for shaping the dry preform is heated by the heater. Thus, the fiber sheets in the plurality of dry tape members 22 after bending may be heat-sealed with the thermoplastic binder therein to manufacture the shaped dry preform. That is, it becomes possible to manufacture, as the dry preform, the laminate of the dry tape members 22 that has a shape in which a curved surface and a flat surface are coupled or a curved surface and a curved surface are coupled at each of the bending lines 23, which shape is similar to the shape of the laminate of the dry tape members 22 including the web 2 and the flanges 3.

Next, at step S4, the fiber that constitutes the dry preform is impregnated with a thermosetting resin. For this purpose, a space where the dry preform is placed is hermetically sealed and evacuated.

Figure 9:
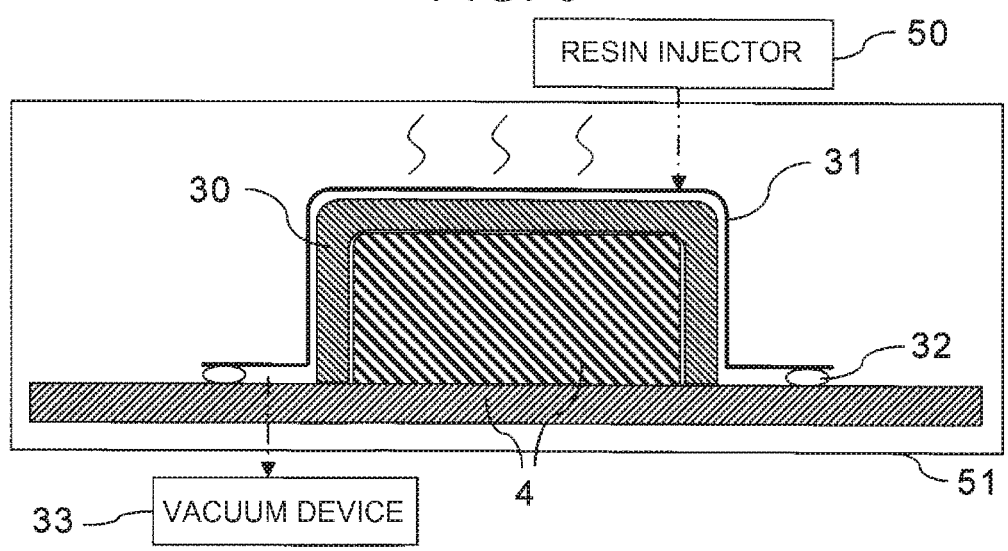
FIG. 9 is a diagram illustrating an instance in the case of bagging the dry preform to manufacture the composite material illustrated in FIG. 2.

FIG. 9 is a diagram illustrating an instance in the case of bagging a dry preform 30 to manufacture the composite material 1 illustrated in FIG. 2.

In the case of manufacturing the composite material 1 by the VaRTM method, the dry preform 30 placed on the die 4 for molding the composite material 1 or the dry preform 30 transferred from the shaping die to the die 4 for molding the composite material 1 is covered with a bagging film 31, and edges of the bagging film 31 are adhered to the die 4 with a sealant 32. Then, a region hermetically sealed by the bagging film 31 is decreased in pressure by a vacuum device 33. That is, the dry preform 30 is bagged by evacuation by the vacuum device 33.

Figure 10:
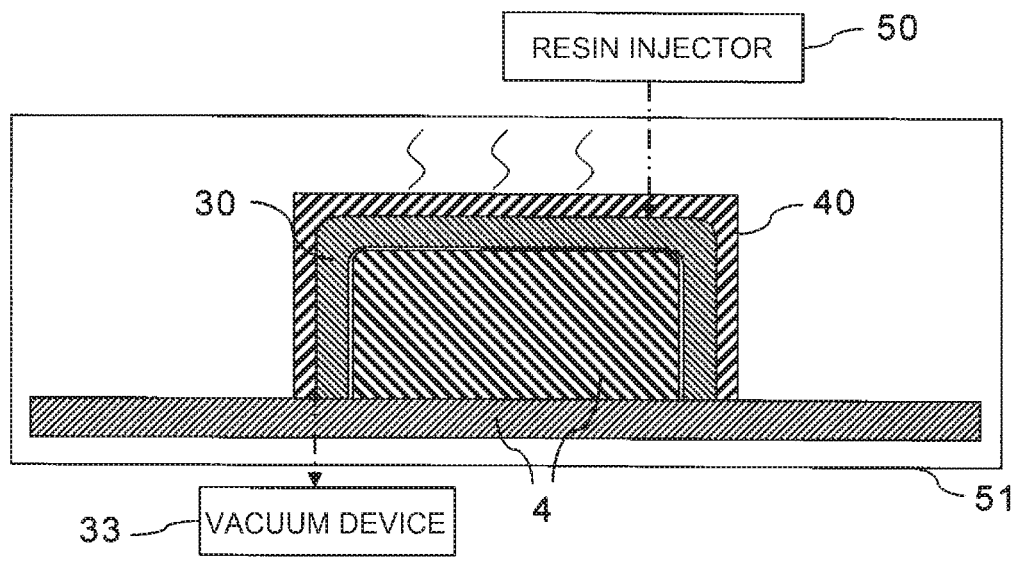
FIG. 10 is a diagram illustrating an instance in the case of using an upper die to manufacture the composite material illustrated in FIG. 2.

FIG. 10 is a diagram illustrating an instance in the case of using an upper die 40 to manufacture the composite material 1 illustrated in FIG. 2.

In the case of manufacturing the composite material 1 by the RTM method using the upper die 40 of a rigid body, the dry preform 30 is disposed in a space defined between the die 4 for molding the composite material 1, which serves as a lower die, and the upper die 40. Then, the space defined between the die 4 and the upper die 40 is evacuated by the vacuum device 33.

After completing evacuation, both in the case of bagging with the bagging film 31 as illustrated in FIG. 9 and in the case of using the upper die 40 as illustrated in FIG. 10, the thermosetting resin is injected from a resin injector 50. That is, the resin is injected from the resin injector 50 into the region covered with the bagging film 31 or the region between the upper die 40 and the die 4. This makes it possible to impregnate the dry preform with the resin.

It should be noted that to make the resin fluid as necessary, the resin is heated to approximately 100° C. in the resin injector 50. In the case of injecting the resin in a heated state, the die 4 may incorporate a heater to heat the resin not to decrease a temperature of the resin. In the case of incorporating the heater in the die 4, for instance, the die 4 may incorporate a pipe in which a heated fluid such as heated steam, heated air, and heated water flows. Alternatively, an electric heater may be incorporated in the die 4. In the case of using the upper die 40 as illustrated in FIG. 10, a heater may be incorporated in the upper die 40. As described above, in the case of incorporating a heater in the die 4, the heater incorporated in the die 4 may perform heat-sealing with the binder.

Next, at step S5, the resin impregnated in the dry preform 30 is thermally cured. Specifically, as illustrated in FIG. 9 or FIG. 10, by a heater 51, the resin is heated to a temperature of approximately 180° C. to 185° C. at which the resin is cured. Thus, the resin may be cured to manufacture the composite material 1 after molding. As a specific instance, the composite material 1 including the web 2 and the flanges 3 as illustrated in FIG. 2 may be molded.

It should be noted that the composite material 1 is not limited to the shape illustrated in FIG. 2 but may be manufactured to have various shapes by taking steps including bending the laminate of the dry tape members 22.

Figure 11:
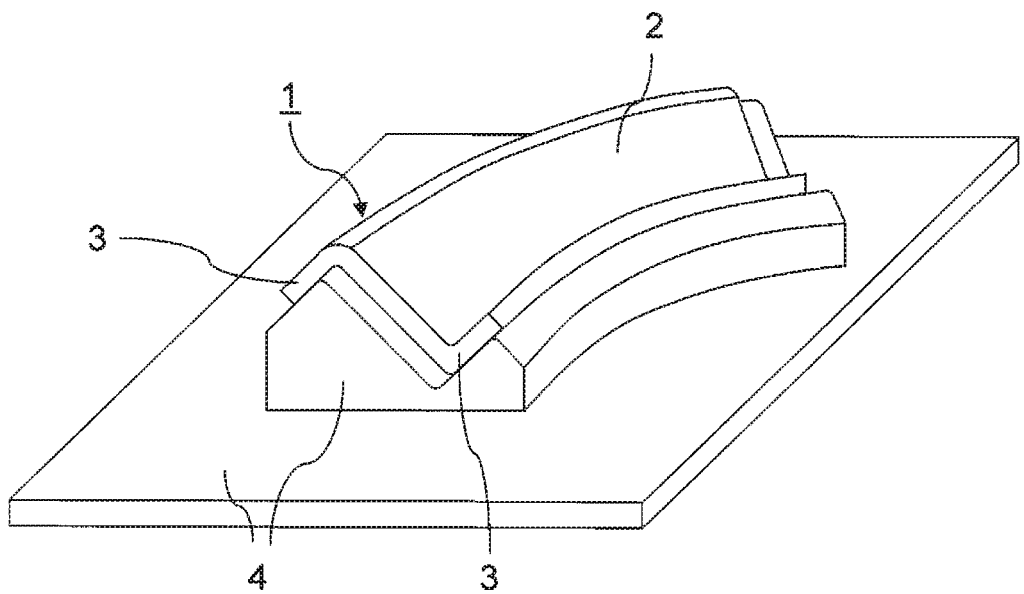
FIG. 11 is a perspective view of a dry preform and a composite material to be manufactured by the method of shaping the preform and the method of molding the composite material illustrated in FIG. 1, illustrating another exemplary shape of the dry preform and the composite material.

FIG. 11 is a perspective view of a dry preform and a composite material to be manufactured by the method of shaping the preform and the method of molding the composite material illustrated in FIG. 1, illustrating another exemplary shape of the dry preform and the composite material.

As illustrated in FIG. 11, the above-described method may be adopted to also manufacture the dry preform and the composite material 1 having such a shape that a curved inner flange 3 is formed on one surface of a web 2 of a flat shape, and that a curved outer flange 3 is formed on the other surface of the web 2. In other words, the dry preform and the composite material 1 of a curved long configuration having a substantially Z cross-sectional shape may be also manufactured by the above-described method.

Figure 12:
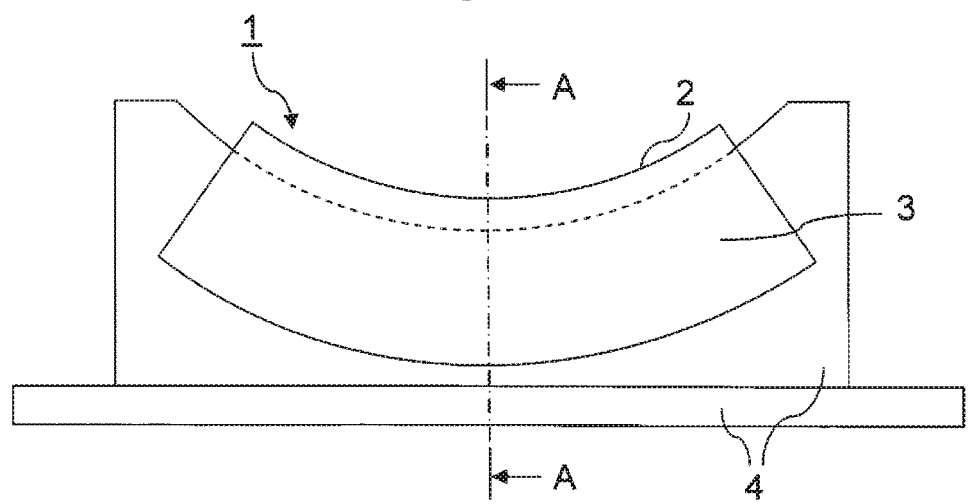
FIG. 12 is a side view of a dry preform and a composite material to be manufactured by the method of shaping the preform and the method of molding the composite material illustrated in FIG. 1, illustrating still another exemplary shape of the dry preform and the composite material.
Figure 13:
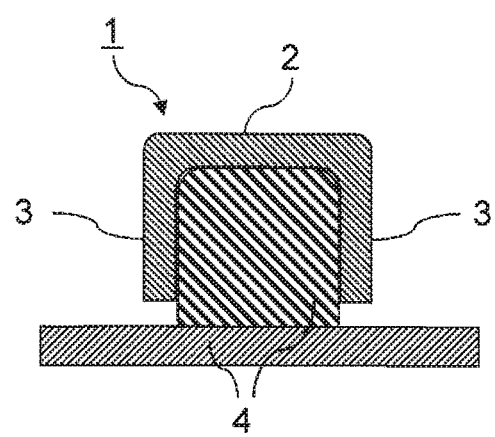
FIG. 13 is a cross-sectional view of the composite material illustrated in FIG. 12, taken along the line A-A.

FIG. 12 is a side view of a dry preform and a composite material to be manufactured by the method of shaping the preform and the method of molding the composite material illustrated in FIG. 1, illustrating still another exemplary shape of the dry preform and the composite material. FIG. 13 is a cross-sectional view of the composite material illustrated in FIG. 12, taken along the line A-A.

As illustrated in FIGS. 12 and 13, the above-described method may be adopted to also manufacture the dry preform and the composite material 1 having such a shape that two flanges 3 of a flat shape are formed on one surface of a web 2 of a curved shape.

The above-described method is likewise applicable to manufacturing not only the dry preform and the composite material 1 including the web 2 and the flanges 3 but also a dry preform and a composite material having a shape of two plate-shaped portions coupled at a bending line, and a dry preform and a composite material having a shape of a plate-shaped portion bent a plurality of times at a plurality of bending lines in an identical direction. In the case of bending the dry tape members 22 at a plurality of bending lines, heat-sealing may be performed at intervals of three or more different distances.

A laminate of the dry tape members 22 may be bent along a bending line to make the laminate of the dry tape members 22 have a surface with a sharp edge or a curved surface such as a round-chamfered surface. In the case of forming a curved surface such as a round-chamfered surface along a bending line, at the time of provisional fastening of the dry tape members 22, the amount of heat-sealing with the binder may be different between portions adjacent to and on opposite sides of an area chamfered along the bending line, instead of the amount of heat-sealing with the binder being different between each portion 22A and the portion 22B which are adjacent to each other at the corresponding bending lines 23 as the border, as illustrated in FIGS. 7 and 8.

Depending on a shape of the dry preform and the composite material 1, the amount of heat-sealing with the binder may be different between a plurality of dry tape members 22 to be laminated, that is, the amount of heat-sealing with the binder may be changed in a direction of lamination of the dry tape members 22. In a specific instance, in the case where the dry preform and the composite material 1 are so thick that a difference between a radius of chamfering on the inside and a radius of chamfering on the outside that is formed by bending at the bending line is large, a difference between a sliding amount of the dry tape member 22 on the inside and a sliding amount of the dry tape member 22 on the outside is also large. In view of this, amounts of heat-sealing with the binder may be adjusted in accordance with sliding amounts of the respective dry tape members 22 for bending the laminate of the dry tape members 22.

In the method of shaping the preform and the method of molding the composite material described above, in the case of manufacturing the dry preform and the composite material 1 by taking steps including a step of bending the laminate of the dry tape members 22, an amount of heat-sealing with the binder in the portions 22A to be bent of the dry tape members 22 is made small to facilitate bending of the dry tape members 22.

Advantageous Effects

Consequently, the method of shaping the preform and the method of molding the composite material make it possible to easily deform the dry tape members 22 in shaping the dry tape members 22 while provisionally fastening the dry tape members 22 at the time of laminating the dry tape members 22. As a result, circumstances of the dry tape members 22 wrinkling or being ripped may be avoided to manufacture the dry preform of an improved quality. Particularly, optimizing the intervals between heat-sealing points in accordance with the shape of the dry preform and the composite material 1 makes it possible to manufacture the dry preform and the composite material 1 of an improved quality even if the dry preform and the composite material 1 have a complicated shape.

Second Example

Figure 14:
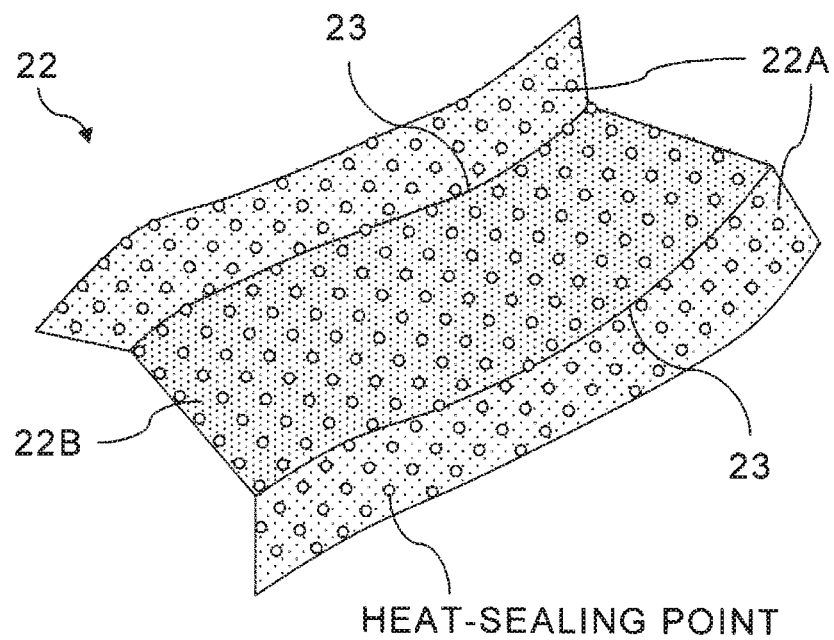
FIG. 14 is a perspective view of a dry tape member at the time of lamination, illustrating a method of shaping a preform and a method of molding a composite material according to a second example of the present invention.

FIG. 14 is a perspective view of a dry tape member at the time of lamination, illustrating a method of shaping a preform and a method of molding a composite material according to a second example of the present invention.

The method of shaping a preform and the method of molding a composite material according to the second example illustrated in FIG. 14 is different from the method of shaping the preform and the method of molding the composite material according to the first example in that heat-sealing points are at constant intervals in provisionally fastening the dry tape members 22, and that a plurality of binders having different melting points are used to form the dry tape members 22. The rest of the procedure in the method of shaping a preform and the method of molding a composite material according to the second example is substantially the same as the method of shaping the preform and the method of molding the composite material according to the first example. Consequently, only the dry tape member 22 is illustrated in FIG. 14, and identical or corresponding components are denoted with the same reference signs and will not be elaborated here.

As illustrated in FIG. 14, a representative value of a melting point of a thermoplastic binder in the portions 22A to be bent along the bending lines 23 in the plurality of dry tape members 22 may be referred to as a first melting point representative value T1. Meanwhile, a representative value of a melting point of a thermoplastic binder in the portions 22B adjacent to the portions 22A to be bent may be referred to as a second melting point representative value T2 lower than the first melting point representative value T1. That is, materials used as the binders may be selected to make the melting point representative value T1 of the binder in the portions 22A to be bent along the bending lines 23 in the dry tape members 22 higher than the melting point representative value T2 of the binder in the portions 22B adjacent to the portions 22A to be bent.

Then, partial heat-sealing may be performed with the thermoplastic binders for provisionally fastening the dry tape members 22 at a temperature T (T2<T<T1) lower than the first melting point representative value T1 and higher than the second melting point representative value T2.

Consequently, even if intervals between heat-sealing points for provisional fastening are constant in the portions 22A and 22B that are adjacent to each other at the bending lines 23 as borders in the dry tape members 22, an amount of heat-sealing with the binders may be different between the portions 22A and 22B adjacent to each other at the bending lines 23 as the borders. That is, an amount of heat-sealing with the binder in the portions 22A to be bent along each of the bending lines 23 in the dry tape members 22 may be made smaller than an amount of heat-sealing with the binder in the portions 22B adjacent to the portions 22A to be bent.

As a matter of course, in the case where a chamfering area is wide, a melting point representative value of the thermoplastic binder is different between portions adjacent to and on opposite sides of an area along each of the bending lines 23. In this case, the amount of heat-sealing with the binder may be different between the portions adjacent to and on opposite sides of an area along the bending line 23.

The dry tape members 22 may include two kinds of binders having different melting points or may include three or more kinds of binders having different melting points. While the thermoplastic binder in the portions 22A to be bent along the bending lines 23 in the dry tape members 22 may be made of one kind of material having a relatively high melting point, the thermoplastic binder in the portions 22B adjacent to the portions 22A to be bent may be made of one kind of material having a relatively low melting point. A plurality of kinds of materials having different melting points may be blended at different ratios to make two kinds of thermoplastic binders having different representative values, such as average values, intermediate values, minimum values, and maximum values, of melting points.

Therefore, in the case where two kinds of binders having different representative values of melting points are each made of one kind of material, the first melting point representative value T1 is a melting point of a first material, and the second melting point representative value T2 is a melting point of a second material when a deviation of melting point of an identical material is ignored. In a specific instance, nylon 12 (abbreviated as PA12), which is a polyamide including the aliphatic skeleton, may be used as a material of the binder, and has a melting point of 176° C. Meanwhile, nylon 1010 (abbreviated as PA1010) may be also used as a material of the binder, and has a melting point of 202° C., which is higher than the melting point of nylon 12.

In view of this, while the thermoplastic binder in the portions 22B that are adjacent to the portions 22A to be bent along the bending lines 23 in the dry tape members 22, such as the portions to form the web surface 20, may be made of nylon 12 having a relatively low melting point, the thermoplastic binder in the portions 22A to be bent along the bending lines 23 in the dry tape members 22, such as the portions to form the flange surfaces 21, may be made of nylon 1010 having a relatively high melting point. Then, spot heating may be performed at constant intervals at a temperature higher than 176° C., which is the melting point of nylon 12, and lower than 202° C., which is the melting point of nylon 1010.

As a result, although the portions 22B, such as the web surface 20, that are not to be bent along the bending lines 23 in the dry tape members 22 and that include the binder made of nylon 12 are heat-sealed at constant intervals, the portions 22A, such as the flange surfaces 21, that are to be bent along the bending lines 23 in the dry tape members 22 and that include the binder made of nylon 1010 are not heat-sealed even if a heating terminal of a heater is pressed on the portions 22A.

That is, the dry tape members 22 are laminated while the dry tape members 22 are heat-sealed at constant intervals at a temperature at which only the thermoplastic binder having a lower melting point melts. As a result, while only the portions 22B that are not to be bent along the bending lines 23 in the dry tape members 22 may be heat-sealed in a spotted manner and provisionally fastened, the portions 22A that are to be bent along the bending lines 23 in the dry tape members 22 may not be provisionally fastened but be made freely slidable. That is, amounts of heat-sealing the dry tape members 22 may be changed at the bending lines 23 as borders.

It should be noted that dependent on the shape of the dry preform and the composite material 1, it is desirable in many cases to provisionally fasten the portions 22A to be bent along the bending lines 23 in the dry tape members 22 to some degree. In view of this, a plurality of kinds of thermoplastic binders having different melting points may be blended to thereby heat-seal the portions 22A to be bent along each of the bending lines 23 with a smaller amount of heat-sealing than an amount of heat-sealing with which the portions 22B adjacent to the portions 22A to be bent is heat-sealed.

In other words, representative values, such as average values, of melting points of the binders may be adjusted to control secureness of heat-sealing. In a specific instance, blending ratios of nylon 12 and nylon 1010 may be changed to prepare two kinds of binders with which heat-sealing amounts are different when the two binders are heated at a predetermined temperature.

In the above-described second example, the melting points of the thermoplastic binders are optimized so that the amount of heat-sealing with the binder in the portions 22A to be bent in the dry tape members 22 is made small. According to the second example, therefore, bending of the dry tape members 22 is facilitated in a similar manner to the first example so as to prevent the dry tape members 22 from wrinkling and being ripped, thereby manufacturing the dry preform of an improved quality.

Moreover, in the second example, even if the pressure terminal of the heater is pressed on and heats the dry tape members 22, the amounts of heat-sealing are adjustable. Consequently, even in the case of automatically fastening the dry tape members 22 provisionally by spot welding at a plurality of positions simultaneously using an automatic heater, such as an automatic heating robot, including a plurality of pressure terminals, secureness of provisional fastening of the dry tape members 22 is changeable at different positions.

As a matter of course, provisional fastening of the dry tape members 22 may be performed using an automatic heater with a single pressure terminal or using a portable heater. In this case, the first example may be combined with the second example. That is, both of the intervals between the heat-sealing points and the melting points of the binders may be adjusted to optimize the amounts of heat-sealing the dry tape members 22.

Third Example

Figure 15:
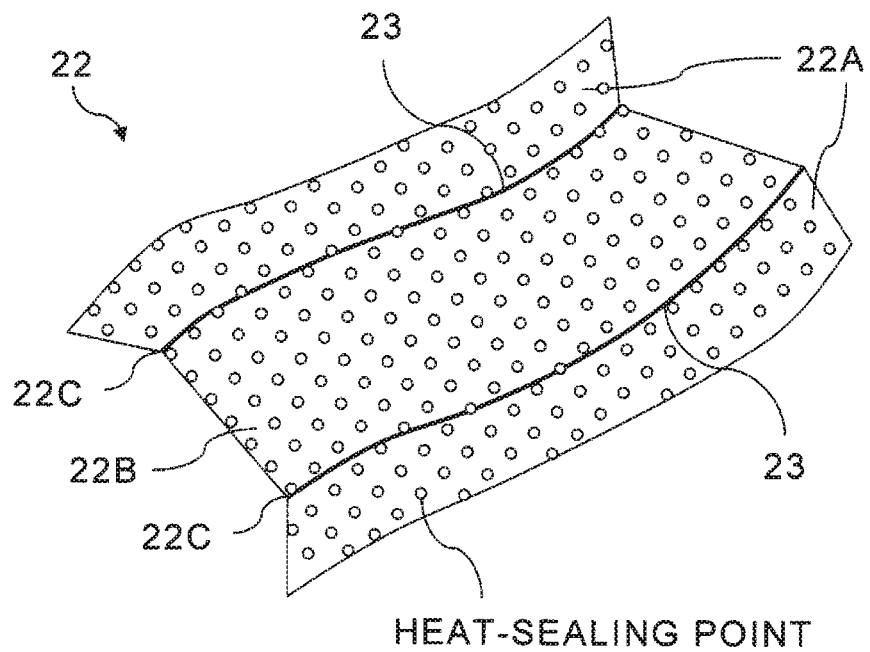
FIG. 15 is a perspective view of a dry tape member at the time of lamination, illustrating a method of shaping a preform and a method of molding a composite material according to a third example of the present invention.

FIG. 15 is a perspective view of a dry tape member at the time of lamination, illustrating a method of shaping a preform and a method of molding a composite material according to a third example of the present invention.

The method of shaping a preform and the method of molding a composite material according to the third example illustrated in FIG. 15 is different from the method of shaping the preform and the method of molding the composite material according to the first example in that heat-sealing points are at constant intervals in provisionally fastening the dry tape members 22, and that an amount of heat-sealing with a thermoplastic binder in an area along each of the bending lines 23 is made larger than an amount of heat-sealing with a thermoplastic binder in portions adjacent to and on opposite sides of the area along the bending line 23. The rest of the procedure in the method of shaping a preform and the method of molding a composite material according to the third example is substantially the same as the method of shaping the preform and the method of molding the composite material according to the first example. Consequently, only the dry tape member 22 is illustrated in FIG. 15, and identical or corresponding components are denoted with the same reference signs and will not be elaborated here.

As typically observed in the case of bending the dry tape members 22 along the bending lines 23 to form the web surface 20 and the flange surfaces 21, in the case of bending the dry tape members 22 at the bending lines 23 to form a plurality of surfaces, chamfered portions 22C, such as round-chamfered portions, are often formed in portions that couple the surfaces. The chamfered portions 22C are apt to wrinkle because the dry tape members 22 are bent in a curved state.

In view of this, an area of the chamfered portions 22C along the bending lines 23 may be continuously heat-sealed. Specifically, an amount of heat-sealing with the thermoplastic binder in the chamfered portions 22C formed in a plurality of dry tape members 22 when bent along the bending lines 23 may be made larger than an amount of heat-sealing with the thermoplastic binder in the portions adjacent to the chamfered portions 22C. For instance, in the case of shaping each of the dry tape members 22 in such a manner that the web surface 20 and the flange surfaces 21 are coupled with the chamfered portions 22C, an amount of heat-sealing with the binder in an area from a border between the web surface 20 and the chamfered portion 22C to a border between the flange surface 21 and the chamfered portion 22C may be made large. This makes it possible to prevent the chamfered portions 22C from wrinkling.

Figure 16:
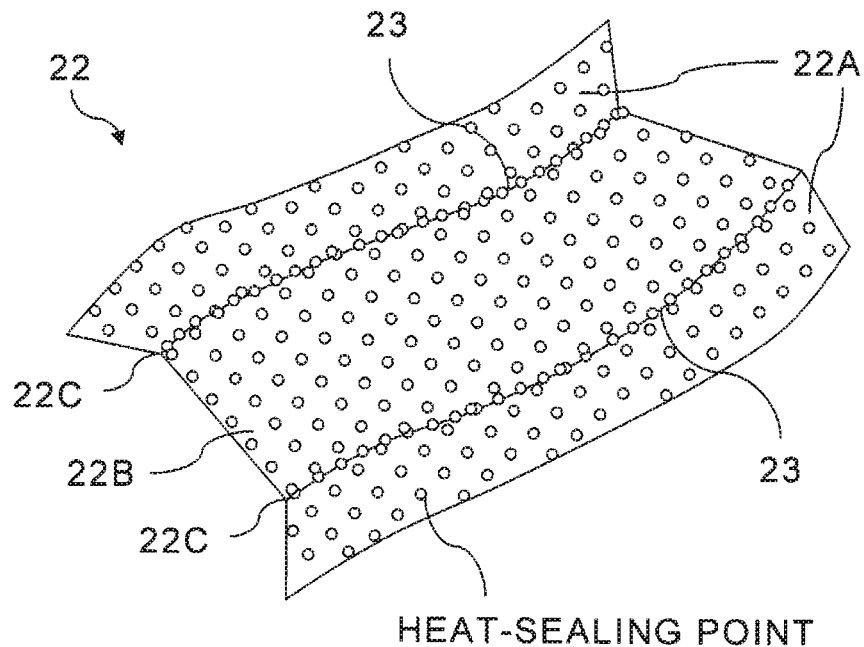
FIG. 16 is a perspective view of a dry tape member at the time of lamination, illustrating a modified example of the third example illustrated in FIG. 15.

FIG. 16 is a perspective view of a dry tape member 22 at the time of lamination, illustrating a modified example of the third example illustrated in FIG. 15.

As illustrated in FIG. 16, instead of continuously heat-sealing the areas of the chamfered portions 22C, heat-sealing may be performed intermittently at narrow intervals of approximately 1 inch. In this case, in provisional fastening, the chamfered portions 22C of each of the dry tape members 22 are not completely heat-sealed. This enables each of the dry tape members 22 to slightly slide when bent along the bending lines 23 so as to improve easiness of bending each of the dry tape members 22.

Moreover, the chamfered portions 22C of each of the dry tape members 22 are heat-sealed at constant intervals so that heat-sealing with the binder does not hinder permeation of a thermosetting resin when the fiber is impregnated with the thermosetting resin. This makes it possible to prevent defective permeation of the resin from generating voids, for instance. As a result, the quality of the composite material 1 may be improved.

In either one of cases of heat-sealing the dry tape members 22 along the bending lines 23 continuously or intermittently, the dry tape members 22 may be heat-sealed manually by an operator using a heater or by automatic control (such as NC control) using an automatic heater such as a robot. In the case where heat-sealing is performed continuously along the bending lines 23 as illustrated in FIG. 15, it is possible to decrease the number of movements of the heating terminal of the heater close to and away from the dry tape members 22. Consequently, work time required for provisional fastening of the dry tape members 22 may be made shorter than in the case where heat-sealing is performed intermittently along the bending lines 23 as illustrated in FIG. 16.

In the above-described third example, in provisional fastening of the dry tape members 22, heat-sealing is performed along the bending lines 23 continuously or intermittently. According to the third example, therefore, bending of the dry tape members 22 is facilitated in a similar manner to the first example and the second example so as to prevent the dry tape members 22 from wrinkling and being ripped, thereby manufacturing the dry preform of an improved quality.

As a matter of course, at least one of the first example or the second example may be combined with the third example. That is, an amount of heat-sealing with the binder in the area along each of the bending lines 23 may be made large, and at the same time, the amount of heat-sealing with the binder may be different between the portions adjacent to and on opposite sides of the area along the bending line 23. In this case, it is appropriate that an amount of heat-sealing with the binder in the portion that is adjacent to the area along the bending line 23 and that is to be bent is made small, and that an amount of heat-sealing with the binder in the portion that is adjacent to the area along the bending line 23 and that is not to be bent is made large.

Fourth Example

Figure 17:
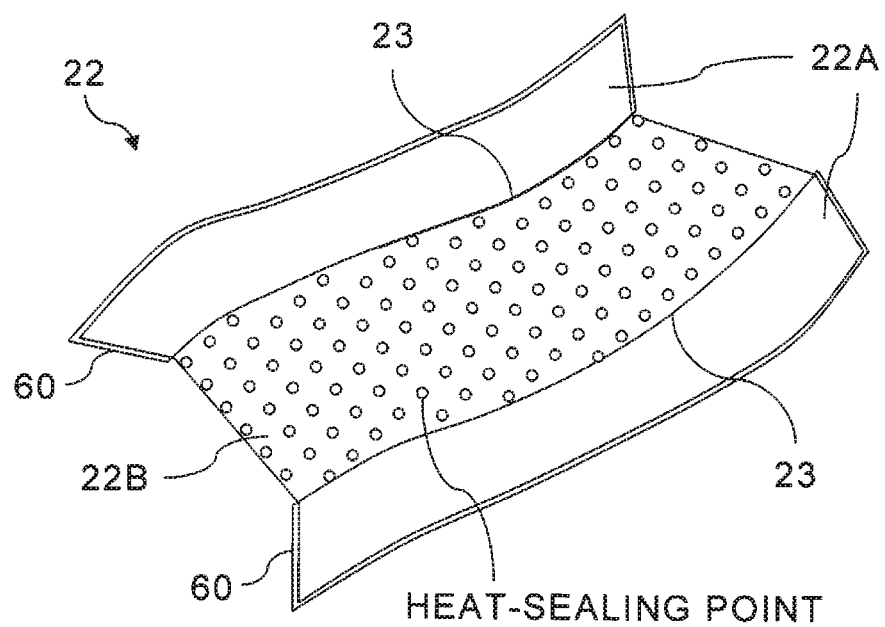
FIG. 17 is a perspective view of a dry tape member at the time of lamination, illustrating a method of shaping a preform and a method of molding a composite material according to a fourth example of the present invention.

FIG. 17 is a perspective view of a dry tape member at the time of lamination, illustrating a method of shaping a preform and a method of molding a composite material according to a fourth example of the present invention.

The method of shaping a preform and the method of molding a composite material according to the fourth example illustrated in FIG. 17 is different from the methods of shaping the preform and the methods of molding the composite material according to the first example and the second example in that sheets 60 that prevent heat-sealing with the thermoplastic binder are interposed between layers of the portions 22A to be bent along each of the bending lines 23 in the plurality of dry tape members 22 instead of making irregular the intervals between the heat-sealing points and the melting points of the binders in provisionally fastening the dry tape members 22. The rest of the procedure in the method of shaping a preform and the method of molding a composite material according to the fourth example is substantially the same as the method of shaping the preform and the method of molding the composite material according to the first example or the second example. Consequently, only the dry tape member 22 is illustrated in FIG. 17, and identical or corresponding components are denoted with the same reference signs and will not be elaborated here.

As illustrated in FIG. 17, the sheets 60 that prevent heat-sealing with the thermoplastic binder may be interposed between layers of the portions 22A to be bent along the bending line 23 in the plurality of dry tape members 22. The sheet 60 may be made of a heat-resistant film of, for instance, polytetrafluoroethylene, which is capable of resisting a temperature at the time of heat-sealing with the binder.

With this configuration, the portions 22A, such as the flange surfaces 21, to be bent along the bending lines 23 in the plurality of dry tape members 22 may be kept not heat-sealed with the thermoplastic binder, and the portions 22B, such as the web surface 20, adjacent to the portions 22A to be bent may be heat-sealed with the thermoplastic binder. That is, the sheets 60 to prevent heat-sealing with the binder are interposed between the portions 22A to be bent along the bending line 23 in the dry tape members 22 so that adjacent dry tape members 22 in the lamination direction may not be adhered to each other even if the heating terminal of the heater is pressed on the portions 22A.

The sheets 60 are drawn out of the laminate of the dry tape members 22 after provisional fastening of the dry tape members 22. For this purpose, end portions of the sheets 60 are made to protrude from the laminate of the dry tape members 22 to facilitate drawing out the sheets 60. The sheets 60 may be placed and removed every time the dry tape members 22 are laminated and provisionally fastened.

More specifically, on a dry tape member 22 on which the sheet 60 is placed, another dry tape member 22 is placed and provisionally fastened by partial heat-sealing with the binder. Then, the sheet 60 is drawn out, and the sheet 60 is placed again on the uppermost dry tape member 22 provisionally fastened. Similarly, the following steps are repeated: lamination of a dry tape member 22; provisional fastening by partial heat-sealing; and drawing out the sheet 60. This makes it possible to manufacture the laminate of the dry tape members 22 with only the portions 22B, such as the web surface 20, adjacent to the portions 22A to be bent along the bending lines 23 being provisionally fastened.

Alternatively, a plurality of dry tape members 22 and a plurality of sheets 60 may be alternately superposed on one another and laminated while provisionally fastened, and after provisional fastening of all of the dry tape members 22 is completed, each of the sheets 60 may be drawn out.

In the laminate of the dry tape members 22 provisionally fastened and laminated in this manner, the portions 22A, such as the flange surfaces 21, to be bent along the bending lines 23 in the plurality of dry tape members 22 are not fastened provisionally, and the portions 22B, such as the web surface 20, adjacent to the portions 22A to be bent are partly heat-sealed with the binder and provisionally fastened. This facilitates bending of the laminate of the dry tape members 22.

In the above-described fourth example, instead of making irregular the intervals between the heat-sealing points and the melting points of the binders in provisionally fastening the dry tape members 22, the sheets 60 to prevent heat-sealing with the binder and provisional fastening are interposed between each adjacent pair of the portions 22A, such as the flange surfaces 21, to be bent along the bending lines 23 in the plurality of dry tape members 22. According to the fourth example, therefore, bending of the dry tape members 22 is facilitated in a similar manner to the first example and the second example so as to prevent the dry tape members 22 from wrinkling and being ripped, thereby manufacturing the dry preform of an improved quality.

Particularly, even in the case of using one kind of binder, amounts of heat-sealing with the binder are adjustable. Moreover, even in the case where heat-sealing intervals are constant, amounts of heat-sealing with the binder are adjustable. This makes it possible to form portions not to be easily heat-sealed even in the case of automatic heat-sealing with the binder using a heater such as a robot including a plurality of heating terminals.

Furthermore, the fourth example may be combined with the third example. That is, an amount of heat-sealing with the binder in the area along each of the bending lines 23 in the dry tape members 22 may be made large, and at the same time, the sheets 60 to prevent heat-sealing with the binder and provisional fastening may be interposed between each adjacent pair of the portions that are adjacent to the area along the bending lines 23 and that are to be bent.

Other Examples

Although particular examples have been described above, the described examples are only instances and do not restrict the scope of claims. The novel methods and devices described here may be practiced in various other forms. In addition, in the forms of the methods and devices described here, various omissions, replacements, and changes may be made without departing from the spirit of the present invention. The appended claims and the equivalents thereof include such various forms and modified examples, which are included in the scope and the spirit of the present invention.

For instance, as described above, part or all of each of the examples may be combined. That is, at least one of the followings is satisfied. That is, (i) an amount of heat-sealing with the thermoplastic binder is changed in an area along each of the bending lines 23 in the dry tape members 22, (ii) an amount of heat-sealing with the thermoplastic binder is different between portions adjacent to and on opposite sides of the area along each bending line 23, or (iii) an amount of heat-sealing with the thermoplastic binder is different between the portions 22A and 22B adjacent to each other at each of the bending lines 23 as a border.

The invention claimed is:

1. A method of shaping a preform, the method comprising:
laminating a plurality of dry tape members each comprising a binder and fiber while partly heat-sealing the plurality of dry tape members with the binder to provisionally fasten each of the plurality of dry tape members to an adjacent dry tape member;
bending the plurality of dry tape members, which have been provisionally fastened, along at least one bending line; and
heat-sealing the plurality of dry tape members, which have been bent, with the binder to manufacture a shaped dry preform, wherein the binder includes a first thermoplastic binder having a first representative value of a first melting point, and a second thermoplastic binder having a second representative value of a second melting point lower than the first representative value of the first melting point of the first thermoplastic binder,
wherein first portions to be bent along the at least one bending line in the plurality of dry tape members includes the first thermoplastic binder, second portions adjacent to the first portions to be bent includes the second thermoplastic binder, the first portions and the second portions are adjacent to each other at the at least one bending line as a border,
wherein the partly heat-sealing of the plurality of dry tape members with the binder in the laminating includes pressing one or more heating terminals on the plurality of dry tape members at predetermined intervals and heat-seals only the second portions among the first portions and the second portions, the one or more heating terminals having a temperature lower than the first representative value of the first melting point and higher than the second representative value of the second melting point during the pressing of the one or more heating terminals on the plurality of dry tape members, wherein the pressing of the one or more heating terminals on the plurality of dry tape members makes the second portions heat-sealed, and doesn't make the first portions heat-sealed even when the heating terminal is pressed on the first portions, and wherein the bending is performed in a state where only the second portions among the first portions and the second portions are heat-sealed, and the first portions are slidable with respect to each other.

2. The method according to claim 1, wherein during the bending, the plurality of dry tape members is bent along the at least one bending line to form a shape comprising a web and at least one flange, and during the laminating, an amount of heat-sealing with the binder in portions to be the at least one flange is smaller than an amount of heat-sealing with the binder in portions to be the web.

3. The method according to claim 1, wherein an amount of heat-sealing with the binder in chamfered portions formed in the plurality of dry tape members when bent along the at least one bending line is larger than an amount of heat-sealing with the binder in portions adjacent to the chamfered portions.

4. The method according to claim 1, wherein the first portions have a shape comprising a flat surface, and the second portions have a shape comprising a curved surface.

5. The method according to claim 1, wherein the partly heat-sealing of the plurality of dry tape members with the binder in the laminating is performed by automatic heating robot including the one or more heating terminals.

6. The method according to claim 1, wherein the plurality of dry tape members includes third portions adjacent to the second portions, and the partly heat-sealing heat-seals the plurality of dry tape members with the binder so that an amount of heat-sealing in the second portions is larger than an amount of heat-sealing in the third portions.

7. The method according to claim 1, wherein each of the first thermoplastic binder and the second thermoplastic binder is made of a plurality of kinds of materials having different melting points blended at different ratios.

8. The method according to claim 1, wherein the predetermined intervals are constant intervals, and the temperature of the one or more heating terminals during the pressing is a temperature at which only the second thermoplastic binder having a lower melting point melts among the plurality of dry tape members.

9. A method of molding a composite material, the method comprising:

manufacturing a dry preform by the method according to claim 1;

impregnating the dry preform with a thermosetting resin; and thermally curing the preform to manufacture the composite material.

* * * * *